Aug. 30, 1938.    J. M. GUTMANN ET AL    2,128,773
ARRANGEMENT FOR TAKING MOTION PICTURES IN NATURAL COLORS
Filed Feb. 7, 1935    2 Sheets-Sheet 1
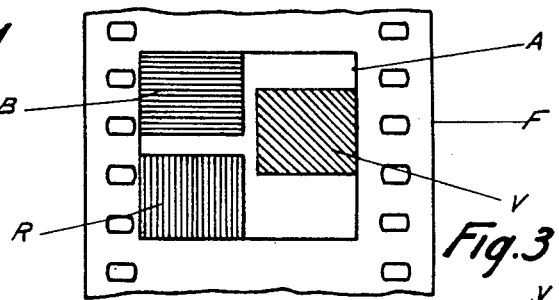
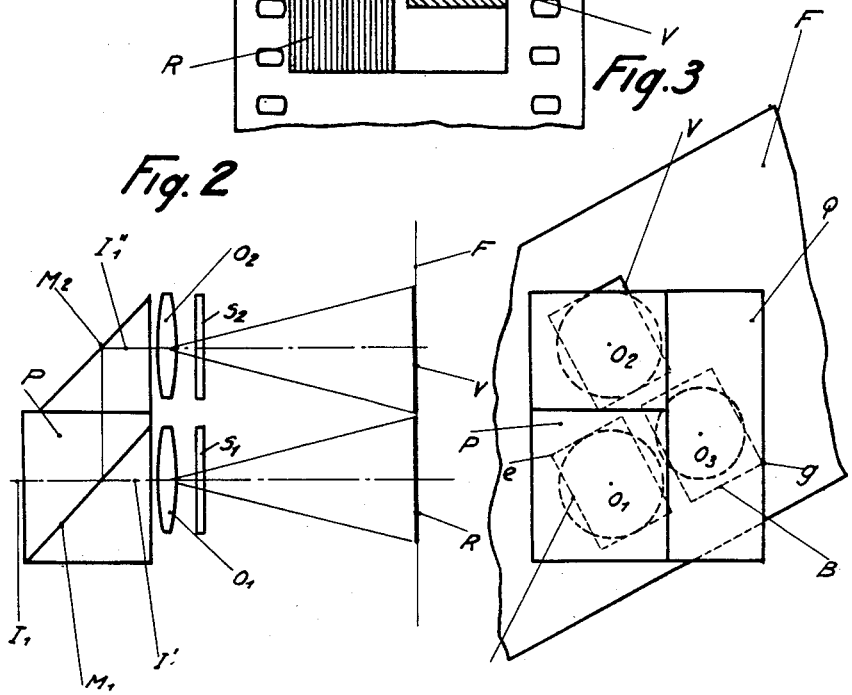
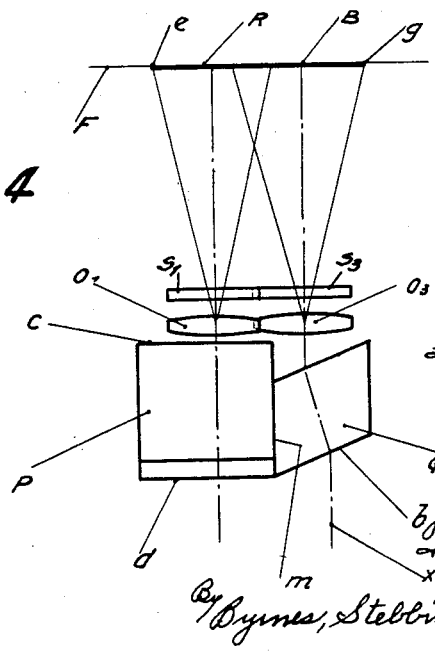
Inventors:
Jean-Marie Gutmann
Pierre Angenieux
By Byrnes, Stebbins & Blenko, Attys.

Aug. 30, 1938.   J. M. GUTMANN ET AL   2,128,773
ARRANGEMENT FOR TAKING MOTION PICTURES IN NATURAL COLORS
Filed Feb. 7, 1935   2 Sheets-Sheet 2
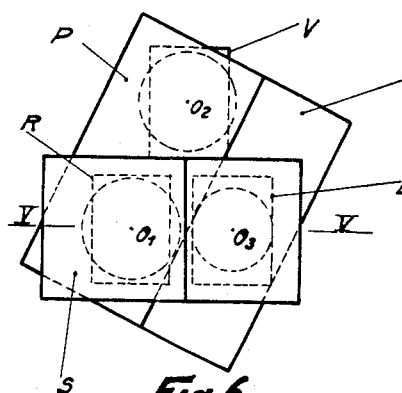
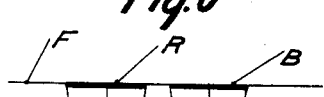
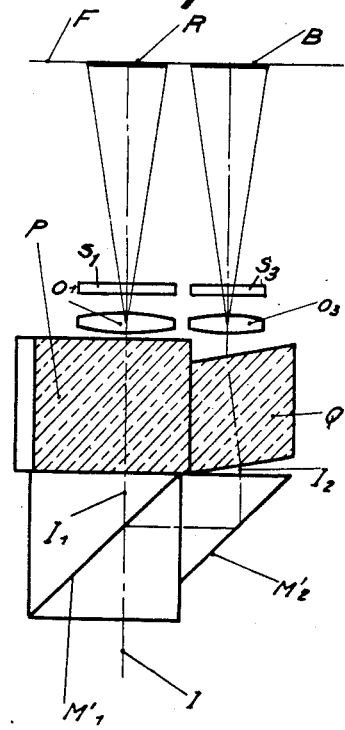
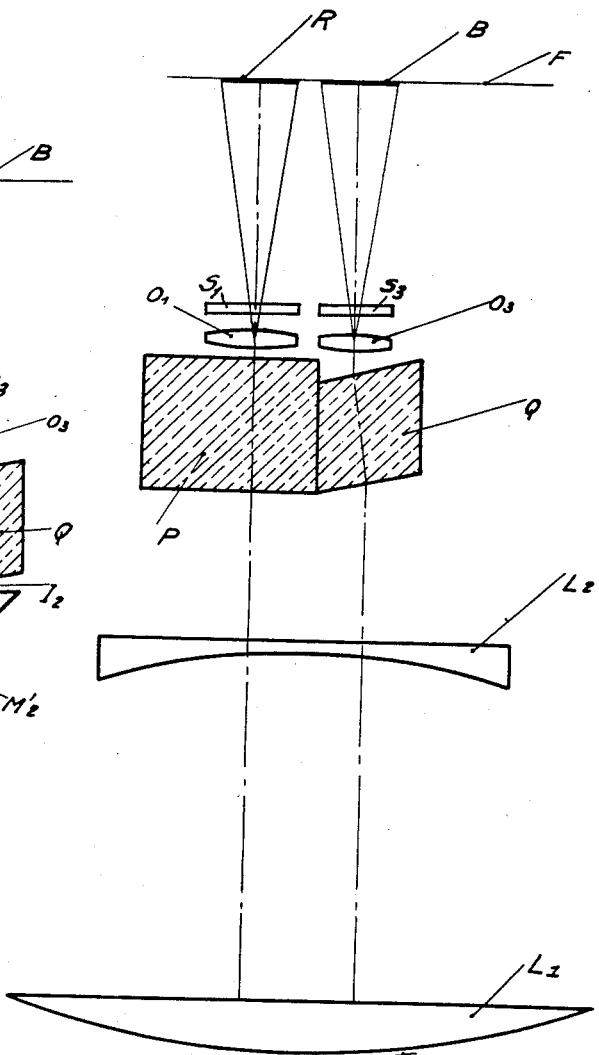
Inventors:
Jean-Marie Gutmann,
Pierre Angenieux,
By Byrnes, Stebbins & Blenko, Attys Patented Aug. 30, 1938

2,128,773

UNITED STATES PATENT OFFICE 2,128,773

ARRANGEMENT FOR TAKING MOTION PICTURES IN NATURAL COLORS

Jean Marie Gutmann and Pierre Angénieux, Paris, France

Application February 7, 1935, Serial No. 5,464
In France February 17, 1934

2 Claims. (Cl. 88—16.4)

This invention relates to an arrangement for taking motion pictures in natural colors.

It is well known that the reproduction of natural colors in the projection of motion pictures can be obtained by projecting onto the screen selected images of the objects, which have been recorded on the film through blue, green and red screens respectively, and are projected through similar filter screens.

Actually the positive film which is projected is a copy of a negative film which can be obtained in various ways. For substantially accurate color reproduction the subject must be photographed through at least three colored filters, giving negative images of the blue, green and red parts of the scene respectively. Each of the selected blue, green or red images will be called the "elementary monochromatic image" or simply "elementary image". It will be seen immediately that the three elementary monochromatic images constituting a single polychromatic image can be recorded either simultaneously or successively.

If they are recorded simultaneously and from a single point of view, the positive obtained by contact and intended for projection will give elementary images, which are always capable of superposition however fast the subject may have been moving. If the three elementary images were taken from three different points of view or were taken in succession, i. e. at slightly different times, the set of monochromes obtained would no longer be strictly superposable and the result would be that the objects depicted would be surrounded by a disagreeable color fringe which would be the more marked the greater the speed at which those objects are moving.

With the polychromatic methods now used in which three or more distinct images are utilized, the means used for attaining the desired object may be classified into four main types, but none of them provides a complete and practical solution of the problem.

In the first type, three images only are taken successively behind a single objective, the selecting screens being located, for instance, on the shutter. The three elementary monochromes are taken in succession, but from a single point of view. Thus, parallax in space does not come in, but there is a kind of parallax in time due to which the three elementary images of a moving object are not capable or superposition. This can be remedied to a certain extent by increasing the taking speed, but this does not achieve a satisfactory solution so that this method has been abandoned.

In the second type three objectives are used located as close as possible side by side, and the views are taken at the normal speed. Nevertheless the images which are obtained can only be superposed, when the objects are located at infinity, with any intermediate planes. This arrangement, long since found defective, could never be put into practice.

The third type comprises the methods in which likewise three objectives are used, but in front of which a suitable lens is placed so that this lens gives at infinity, or at a definite distance, always the same, a virtual image of the subject placed at its focus. The subject being thus in effect removed to infinity or to a fixed distance, it gives through the three objectives three images which can be superposed provided the subject is limited to one plane. It is convenient to replace the series of lenses which would be necessary due to the very variable distance of subjects by a lens of variable focal length or by an afocal but variable optical system. Such an arrangement is claimed in French Patent No. 716,632 of March 4th, 1931.

In this case the optical system selected (lenses, variable afocal optical system or the like) gives at infinity a virtual image of a plane object. It is this virtual image which is taken by the three objectives. This image is however only reduced to one plane when the subject to be photographed itself lies in one plane. Thus, if it is a question of thick objects or objects lying in successive planes (which is the most general case in the taking of scenes) the virtual image has a corresponding thickness, so that the three objectives photographing a solid object can only give superposable images for one plane of this solid object.

Consequently, since only one plane yields a good image in taking, all the other planes yield fringed images due to the above mentioned parallax. As a matter of fact, only the red and green fringes are very visible, the blue fringe being readily tolerated by the eye. But the red fringe in particular is exceedingly disagreeable.

The fourth type comprises the arrangements in which there are provided in front of the objectives prisms or mirrors so arranged that the three objectives have the same point of view. To maintain a sufficient field for the objectives and yet to use a material portion if not the whole of their beams, these arrangements necessitate prisms or mirrors which are particularly cumbersome and require such a distance between the axes of the objectives that it is practically impossible to accommodate the three elementary monochromes within the area of a single standard image.

However, French Patents No. 753,682 of August 1st, 1932, and No. 771,646 of July 3rd, 1933, have circumvented the difficulty by neglecting space parallax for one of the monochromes. In these patents, mirrors or prisms are so arranged that both the red and the green monochromes have the same point of view, the system being limited in essence to two objectives, and the blue monochrome is recorded immediately after the others with one of the objectives by using a camera having a film feed half the amount of the normal film feed. The parallax of the blue elementary image is zero, except in the case in which the objects are moving. This parallax gives then a substantial blue fringe, which is particularly visible in the near planes, even when the speed of movement is not very great.

On the other hand, it has already been proposed (French Patent No. 644,804 of October 19th, 1927) to produce, in colored motion pictures, three elementary monochromatic images in blue, green and red by using three separate objectives (as in the above mentioned second type) and by placing in front of these three objectives a system of prisms to obtain two of the three elementary monochromatic images (the green and the red images) from a common point of view the third selected image, that is the blue image, being taken from a different point of view. This system of prisms comprised more particularly, in combination, a semi-transparent and semi-reflecting surface and a totally reflecting surface, which surfaces made it possible to subdivide an incident beam of light falling on the system of prisms into two parts acting respectively on the objectives for the green and red images. Another parallel incident beam acting on the objective for the blue image undergoes, on the contrary, no deviation when passing through the system of prisms.

According to our invention, it is proposed to use in a similar manner three objectives and such a system of prisms for obtaining in each normal picture space of an ordinary motion picture film and with sufficient luminosity, three photographic images of the same object which are taken simultaneously, selected in blue, green and red for instance by three colored filters, and superposable without causing any colored fringes, which may be disagreeable to the eye.

However, a system of prisms such as that already proposed in French Patent 644,804 for making it possible to obtain the green and red images from one point of view and the blue image from a different point of view, would be open to the objection that it would cut the beams of light, destined for the parts of the field of certain of the elementary images near to their outer edges, if an attempt were made to group the three objectives as near as possible to one another in order to place the three elementary monochromatic images in one normal picture space of a standard film.

This did not occur in the French Patent No. 644,804, in which each of the elementary monochromatic images was obtained on a different film, which made it possible to space the three taking objectives apart sufficiently to avoid the above mentioned drawback.

But, to repeat, this would occur if it were desired to obtain the three monochromes in the normal picture space of a single standard film.

To overcome this drawback it is proposed according to the present invention to cause the incident beam for the blue image to pass through a prism having parallel faces inclined with respect to the optical axis of the said image. Thus this inclined prism deviates the incident beam in question and removes the same from the prism-block traversed by the beams for the green and red images, so that all the points, even the extreme marginal points of the three monochromatic images are permitted to receive a beam of light in spite of the fact that the axes of the three objectives are brought nearer together.

The taking arrangement according to this invention thus comprises in combination: three objectives which are sufficiently near each other to give simultaneously and by means of colored filters three elementary monochromatic images in one normal picture space of a standard motion picture film, an optical system in front of these objectives which comprises a semi-transparent and semi-reflecting surface and a totally reflecting surface, the said surfaces making it possible to obtain the selected red and green images, from the same point of view, and lastly an inclined prism with parallel faces applied to the preceding optical system and making it possible to obtain the selected blue image from a different point of view, without any part of the field of any of the three objectives being intersected by one of the faces or edges of the above mentioned optical system.

As the three elementary monochromatic images obtained with this taking arrangement are so disposed that they occupy only the space which is usually provided for one picture on a film of normal width, they can be projected in a group of three by any of the projection arrangements now used.

Now a taking arrangement as above described gives, due to the parallax of the blue image, blue fringes in projection, which, though less visible than the red and green fringes, of earlier arrangements, may yet in some cases be disagreeable to the eye.

Means are provided according to a further feature of the present invention to eliminate or at least to reduce these blue fringes as much as possible.

For this purpose we propose, in taking brightly illuminated objects, to place in front of the taking device an optical system similar to the system used for simultaneously obtaining red and green images from the same point of view, this extra optical system being provided for bringing the point of view for the blue image into coincidence with that for the red and green images.

In taking objects which are not so well illuminated, or when the light is too poor to ensure sufficient exposure on the film, it is possible, still within the scope of the present invention, to place in front of the taking arrangement an optical system formed of one or more lenses giving an image located at a fixed distance of the object on which focusing is effected, what may be the distance at which the object is.

In the first case, there are three images without any parallax, but the quantity of light utilized by each objective is substantially less than in the second case, where a blue photograph is obtained in which only the images of objects located in the focusing zone are capable of superposition on the corresponding red and green images of the same objects.

The accompanying drawings show diagrammatically and by way of example, various embodiments of the invention. In the drawings:

Figure 1 is a view of part of a standard motion picture film showing the manner in which three elementary monochromatic images are located in one normal picture space, Figure 2 is a sectional view of the optical system in front of the film taken through the plane common to the axes of two of the three objectives, Figure 3 is a front elevation of the optical system, Figure 4 is a plan of the same.

Figures 5 and 6 are a front elevation and a sectional plan on the line V—V of Figure 5 respectively of the optical system of Figures 2 to 4 in combination with a prism block arranged to give the same point of view to the three elementary monochromatic images.

Figure 7 is a sectional plan of the optical system of Figures 2 to 4 in combination with one or two lenses for placing the image of the objects to be taken at infinity or at a definite fixed distance.

Referring to Figures 2 and 3 three objectives $O_1$, $O_2$ and $O_3$ of suitable focus and aperture are placed in front of the film F, their axes being brought so near together that the monochromatic images B, V and R which they give are located in one picture space A of a standard motion picture film as shown in Figure 1. These three objectives are chosen with accurately matched focal lengths so that the three images are taken on the same scale.

The objectives $O_1$ and $O_2$ respectively give images through the red and green screens $S_1$ and $S_2$ which are placed respectively in some part of the beam passing through each objective and these screens could be placed in the objectives themselves. The objectives $O_1$ and $O_2$ give the images R and V respectively.

The objective $O_3$ gives the image B, which is selected in blue by means of a blue screen $S_3$ which is located in the same manner as the red and green screens and could be placed also in the objective.

In front of the pair of objectives $O_1$ and $O_2$ a prism-block P is placed. This prism-block is so formed that it exhibits in front of the objective $O_1$ a semi-reflecting and semi-transparent surface $M_1$ enclosed in the glass and inclined at 45° to the optical axis of the objective $O_1$. The beam going to the objective $O_1$ passes through the surface $M_1$ which forms a transparent mirror so that the beam enters and leaves the block P through plane faces which are perpendicular to the optical axis of the objective $O_1$.

The portion of the prism-block P which is placed in front of the objective $O_2$ is formed of a simple prism with total reflection at its hypotenuse face $M_2$, which may be fully silvered. This face is placed as shown in the figure, parallel to the surface $M_1$.

Under these conditions, an incident beam falling on the prism-block P and meeting the semi-reflecting surface $M_1$ is divided into two parts: one part passes through the surface $M_1$ and then through the objective $O_1$, while the other is reflected by the surface $M_1$ and then by the face $M_2$ and then passes through the objective $O_2$. As a result both objectives $O_1$ and $O_2$ will see the objects to be taken in motion pictures simultaneously and from the same point of view, thus giving images R and V which are always strictly capable of superposition.

The surface $M_1$ may be half silvered to a suitable density or it may be completely silvered, parts being subsequently scraped off or otherwise removed, so that the incident beam is subdivided into a transmitted beam and a reflected beam bearing a suitable proportion to each other.

Again, the prism-block P could be dispensed with and simply replaced by two mirrors, the one being semi-transparent and semi-reflecting and replacing the surface $M_1$, and the other being completely reflecting and replacing the surface $M_2$.

Against the prism group P is placed a prism Q as shown in Figures 3 and 4, and its faces $a$ and $b$ are inclined to the face $c$ and $d$ of the group of prisms P; the function of the prism Q is to deflect the beam of light for the objective $O_3$ and the object of this deflection will now be explained.

The placing of the three elementary monochromatic images B, V and R in a single normal picture space A of the film F (Figure 1) makes it necessary for the prism arrangement to take up very little space. Now, it is desired that the points lying near the edges or right on the edges of the images V and R, for instance the point $e$ of the image R, should receive a beam of light which is not substantially intercepted by the face $m$ of the group of prisms P (Figure 4), since this would cause in projection a lack of green in this part of the field and consequently a red dominant. For this purpose it is absolutely necessary that the face $m$ should be sufficiently far away from the plane common to the axes of the objectives $O_1$ and $O_2$.

But, due to the close spacing of the axes of the three objectives $O_1$, $O_2$ and $O_3$, the face $m$ would be too near the axis of the objective $O_3$ and thus it cuts considerably into the beams of light destined to form the parts of the field of the blue image which are near the marginal point $g$ of this image. The function of the prism Q is to move in effect the optical axis $x$ of the objective $O_3$ further away from the plane $O_1$—$O_2$ in the plane of the object photographed (Figure 4) and thus make it possible for the part of the image B near the point $g$ to receive a sufficient quantity of light.

The system of prisms formed of the prism-block P and the prism Q, which are placed against one another as described above, thus makes it possible to obtain the green and red images from the same point of view and the blue image from a point of view which is distant therefrom by the distance between the common axis of the beams which latter enter the objectives $O_1$—$O_2$ and the axis offset by the prism Q of the beam which passes through the objective $O_3$.

According to a further feature of the invention it is then possible, according to the quantity of light which is available for the taking operation or according to the arrangement of the scene to be taken, to combine with the preceding system of prisms one or other of two different optical systems by placing it in front of the above described system of prisms.

If the objects photographed are brightly lighted, the parallax between the red and green images, on the one hand, and the blue image, on the other, can be definitely suppressed by using a group of prisms S similar to the above described prism-block P and arranged in front of the prisms P and Q as shown in Figures 5 and 6. In the prism-block S a single incident beam I is divided into three beams one for each of the objectives: one beam $I_1$ passes through the semi-reflecting surface $M'_1$ and is then subdivided in the prism-block P of Figures 2 to 4 into two beams $I'_1$ and $I''_1$ for the objectives $O_1$ and $O_2$ respectively: the other beam $I_2$ which is reflected by the surface $M'_1$ is reflected by the surface $M'_2$ and then brought by the prism Q of Figures 2 to 4 again into the axis of the objective $O_3$ for which it is intended.

It is clear that the images which have been taken in these conditions are always capable of superposition whatever may be the relative position of the objects taken, but each objective receives less light than with the arrangement which will be described subsequently.

An alternative arrangement is available and is particularly useful when the objects taken are not so well illuminated or if the light is too poor for sufficient exposure of the film. This arrangement is shown in Figure 7 and makes use of the two light beams resulting from the use of the unit formed of the prisms P and Q of Figures 2 to 4, which allows each objective to receive a quantity of light much greater than in the case of Figures 5 and 6. Then a lens $L_1$ is placed in front of these prisms; this lens, which can be moved along its axis, is used for focusing the whole arrangement according to the distance from the plane which is of greatest interest in the object to be taken. The lens is therefore, located in each case, at such a position that the image given by it, of the plane on which focusing is effected, is in a fixed position and thus lies at a constant distance from the three elementary objectives $O_1$, $O_2$ and $O_3$ which are themselves at a fixed position with respect to the film F. The object on which focusing is effected and which lies at a variable real distance from these elementary objectives is thus caused to appear optically at a constant distance from these latter.

Therefore, the relative position of the three images given by the three elementary objectives for such an object is always absolutely the same, which makes possible projection without any colored fringes on the contour of these objects. On the contrary, objects lying in front of or behind the focusing plane give a blue image which is not superposable with red and green images, since the superposition is carried out for a predetermined plane and since the common point of view of the red and green images differs from the point of view of the blue image.

The blue or yellow fringes (yellow being the complementary color for blue) resulting from this arrangement lie on objects which are not clearly defined, since these objects are not in the focusing plane. In fact, it is found that these blue or yellow fringes are hardly visible unless one goes to an extreme case in taking, that is to say unless very distant and very near planes are taken simultaneously.

The lens $L_1$ of Figure 7 may be positive or negative, and, if the elementary objectives are calculated to give sharp images of objects at infinity, there may be inserted between the lens $L_1$ and the group of prisms P—Q, a fixed lens $L_2$, one of the focal planes of which coincides with the fixed plane in which the images are formed of the objects on which focusing is effected, so that it forms with the lens $L_1$ an afocal system when focusing is effected on infinity.

It is to be noted (Figure 3) that the prism-block P and the prism Q are displaced by a certain angle from the longitudinal axis of the film F and are not parallel or perpendicular to said axis, their longitudinal middle plane being parallel to the plane common to the axes of the two objectives corresponding to the same point of view (for instance for the red and green images). Similarly, in Figure 5, the prism-block S is displaced by a certain angle in relation to the prism-block P and to the prism Q, the transverse middle plane of the prism-block S being parallel to the plane common to the axes of the two objectives corresponding to the red and blue images.

The present invention also comprises as its subject-matter the provision as new commercial products of motion picture negative and positive films of a standard form obtained by means of the taking arrangements described above; these films are characterized in that they comprise successive groups of three images selected in red, green and blue, for instance, each group taking up the space of one normal image on the film; two of the images, in each group are preferably arranged one above the other and the third at the side and at an intermediate level; the three images of each group are illuminated over their whole surface (even to their extreme margins) and either all three are absolutely superposable, or else only two of them (the green and the red) are absolutely superposable, while the third (blue) is superposable on the other two only in the focusing plane.

What we claim is:

1. In an optical system for taking kinematograph pictures in natural colors, three objectives grouped to give three separate images in one normal picture space of a standard strip of film and provided each with an appropriate screen for one of the three selected primary colors, the axes of said objectives being parallel, a prism-block comprising parallel surfaces inclined at 45° to the axes of a pair of the objectives, one of the said surfaces being semi-reflecting and the other substantially completely reflecting for transmitting light partially to one of said pair of objectives and partially to the other of said pair of objectives, a prism beside said prism-block and provided with parallel faces inclined to the axis of the third objective for offsetting toward said prism-block light passing to the third objective, and a second prism-block for transmitting light partially to the first prism-block and partially to the third objective, said second prism-block likewise having parallel surfaces each inclined at 45° to the axes of the objectives, one of the said surfaces being semi-reflecting and the other substantially completely reflecting, the two prism-blocks being so arranged that planes normal respectively to each of the pairs of surfaces and passing through the axes of the objective which receives its light without reflection thereby at right angles to each other.

2. In an optical system for taking kinematograph pictures in natural colors, three objectives grouped to give three separate images in one normal picture space of a standard strip of film and provided each with an appropriate screen for one of the three selected primary colors, the axes of said objectives being parallel, a prism block comprising parallel surfaces inclined at 45° to the axes of a pair of the objectives, one of the said surfaces being semi-reflecting and the other substantially completely reflecting for transmitting light partially to one of said pair of objectives and partially to the other of said pair of objectives, a prism beside said prism-block and provided with parallel faces inclined to the axis of the third objective for offsetting toward said prism-block light passing to the third objective, and at least one lens adjustable along its own optical axis for locating an image of the object to be photographed at a predetermined finite distance relative to the three objectives.

JEAN MARIE GUTMANN.
PIERRE ANGÉNIEUX.